US007676148B2

(12) United States Patent
Hosoi

(10) Patent No.: US 7,676,148 B2
(45) Date of Patent: Mar. 9, 2010

(54) CAMERA, COMPUTER PROGRAM PRODUCT, AND AMOUNT OF LIGHT TO BE EMITTED CALCULATION METHOD

(75) Inventor: Kazuma Hosoi, Narashino (JP)

(73) Assignee: Nikon Corporation, Tokyo (JP)

( * ) Notice: Subject to any disclaimer, the term of this patent is extended or adjusted under 35 U.S.C. 154(b) by 286 days.

(21) Appl. No.: 11/987,789

(22) Filed: Dec. 4, 2007

(65) Prior Publication Data

US 2008/0138056 A1    Jun. 12, 2008

(30) Foreign Application Priority Data

Dec. 7, 2006   (JP) .............................. 2006-330602

(51) Int. Cl.
   *G03B 15/03*   (2006.01)
(52) U.S. Cl. ...................... 396/157; 348/370; 348/371
(58) Field of Classification Search ................... 396/61, 396/164, 175, 157; 348/370, 371
   See application file for complete search history.

(56) References Cited

U.S. PATENT DOCUMENTS 5,371,568 A * 12/1994 Takagi et al. ................ 396/157
5,450,163 A * 9/1995 Iwasaki ....................... 396/234
5,541,706 A * 7/1996 Goto ........................... 396/231
6,154,612 A * 11/2000 Iwasaki ........................ 396/61
7,254,321 B2 * 8/2007 Tokunaga ...................... 396/61
7,463,288 B2 * 12/2008 Aoyama .................. 348/231.1
2006/0013578 A1 * 1/2006 Sato et al. ................... 396/100
2008/0036870 A1 * 2/2008 Uezono .................... 348/222.1

FOREIGN PATENT DOCUMENTS

JP    A-2005-134468    5/2005

* cited by examiner

*Primary Examiner*—W. B. Perkey
*Assistant Examiner*—Warren K Fenwick
(74) *Attorney, Agent, or Firm*—Oliff & Berridge, PLC

(57) ABSTRACT

A camera includes: a photometric unit that acquires two dimensional photometric information of an image of a photographic subject; a separation unit that separates the image of the photographic subject into two groups, based upon photometric information acquired by the photometric unit during non-emission of light by a flash light emission device; and a calculation unit that multiplies the photometric information acquired by the photometric unit during a first light emission by the flash light emission device before photography, by different coefficients for the two groups, and calculates an amount of light required for photography that is to be emitted during a second light emission by the flash light emission device, based upon the photographic information after multiplication by the coefficients.

13 Claims, 10 Drawing Sheets

CAMERA, COMPUTER PROGRAM PRODUCT, AND AMOUNT OF LIGHT TO BE EMITTED CALCULATION METHOD

INCORPORATION BY REFERENCE

The disclosure of the following priority application is herein incorporated by reference:

Japanese Patent Application No. 2006-330602 filed Dec. 7, 2006.

BACKGROUND OF THE INVENTION

1. Field of the Invention

The present invention relates to a camera, a computer program product that includes an amount of light to be emitted calculation program loaded into such a camera, and to an amount of light to be emitted calculation method.

2. Description of Related Art

A technique is per se known for calculating the amount of light to be emitted by a flash light emission device based upon photometric information that is obtained by an image sensor for photometry (refer to Japanese Laid-Open Patent Publication 2005-134468). In this Japanese Laid-Open Patent Publication 2005-134468, there is disclosed the concept of, if the condition (1) that the change of luminance as measured by some region of the image sensor, between the case when the flash light emission device was performing pre-emission of light (i.e. light emission before photography) and the case when it is not emitting light, is greater than or equal to a predetermined amount, and the condition (2) that the color information from that region of the image sensor when light was being pre-emitted was approximately the same as the color of the light from the flash light emission device, are both satisfied, then lowering the weighting of the photometric information from that region of the image sensor during the calculation of the amount of light to be emitted during the main light emission (the amount of light that is to be caused to be emitted during photography).

SUMMARY OF THE INVENTION

According to the prior art, if for example the background is bright sky, then no change of luminance occurs in this background whether light is being pre-emitted or not, and, since the color information of this background also does not agree with the light from the flash light emission device, accordingly the problem arises that the calculation is performed based upon the amounts of measured light, without lowering the weighting of the photometric information from the region of the image sensor that corresponds to this background. Due to this, sometimes it happens that the amount of light to be emitted during the main light emission that is calculated is too low, so that the main photographic subject, such as a person or the like, becomes under exposed.

According to the 1st aspect of the present invention, a camera comprises: a photometric unit that acquires two dimensional photometric information of an image of a photographic subject; a separation unit that separates the image of the photographic subject into two groups, based upon photometric information acquired by the photometric unit during non-emission of light by a flash light emission device; and a calculation unit that multiplies the photometric information acquired by the photometric unit during a first light emission by the flash light emission device before photography, by different coefficients for the two groups, and calculates an amount of light required for photography that is to be emitted during a second light emission by the flash light emission device, based upon the photographic information after multiplication by the coefficients.

According to the 2nd aspect of the present invention, in the camera according to the 1st aspect, it is preferred that the separation unit separates the image of the photographic subject by deciding whether or not, between adjacent regions in a direction from a predetermined edge of the image of the photographic subject towards another edge, at least one of a hue and a luminance specified by photometric information corresponding to each of the regions is approximately equal.

According to the 3rd aspect of the present invention, in the camera according to the 2nd aspect, it is preferred that if a plurality of regions for which the approximate equality has been decided are connected together, the separation unit takes a group that consists of the plurality of regions as a first group among the two groups.

According to the 4th aspect of the present invention, in the camera according to the 3rd aspect, it is preferred that the separation unit decides whether or not at least one of the hue and the luminance is approximately equal in a downwards direction from an upper side of the image of the photographic subject.

According to the 5th aspect of the present invention, in the camera according to the 3rd aspect, it is preferred that the calculation unit makes a coefficient for photometric information that belongs to the first group smaller than a coefficient for photometric information that belongs to a second group.

According to the 6th aspect of the present invention, in the camera according to the 3rd aspect, it is preferred that the camera further comprises a correction unit that corrects the amount of light during the second light emission calculated by the calculation unit, based upon photometric information that belongs to the second group among photometric information acquired by the photometric unit during non-emission of light by the flash light emission device.

According to the 7th aspect of the present invention, in the camera according to the 6th aspect, it is preferred that the correction unit corrects the amount of light during the second light emission so as to be reduced, if the brightness specified by the photometric information that belongs to the second group is greater than or equal to a predetermined value.

According to the 8th aspect of the present invention, in the camera according to the 1st aspect, it is preferred that: the two groups are a background region and a non-background region; the photometric information is information from pixels that are arranged two-dimensionally; and the separation unit (1) sets an upper end pixel as being in the background region for each column of the image of the photographic subject, (2) detects a first pixel in a downwards direction from the upper end pixel, the photometric information of which changes by greater than or equal to a predetermined value with respect to the photometric information of the upper end pixel, as being a pixel in a boundary position, (3) sets a region from the upper end pixel to the pixel in the boundary position as being the background region, and (4) sets a region in a downward direction from the pixel in the boundary position as being the non-background region.

According to the 9th aspect of the present invention, in the camera according to the 8th aspect, it is preferred that the calculation unit makes a coefficient for the photometric information that belongs to the background region smaller than a coefficient for the photometric information that belongs to the non-background region.

According to the 10th aspect of the present invention, in the camera according to the 1st aspect, it is preferred that: the photometric unit comprises an image sensor for photometry that is different from an image sensor for photography; and the number of pixels of the image sensor for photometry is smaller than the number of pixels of the image sensor for photography.

According to the 11th aspect of the present invention, in the camera according to the 1st aspect, it is preferred that the photometric unit acquires the photometric information at a lower density than the pixel density of a photographic image from the image sensor for photography.

According to the 12th aspect of the present invention, a computer program product includes an amount of light to be emitted calculation program that is executed by a computer within a camera, and the program comprises: a first instruction that acquires two dimensional photometric information for an image of a photographic subject during non-emission of light by a flash light emission device; a second instruction that separates the image of the photographic subject into two groups, based upon the photometric information acquired by the photometric unit; a third instruction that acquires photometric information for the image of the photographic subject during a first episode of light emission by the flash light emission device before photography; a fourth instruction that multiplies the photometric information acquired by the third instruction by different coefficients for the two groups; and a fifth instruction that calculates an amount of light required during photography, that is to be emitted during a second episode of light emission by the flash light emission device, based upon the photometric information after multiplication by these coefficients by the fourth instruction.

According to the 13th aspect of the present invention, an amount of light to be emitted calculation method for a flash light emission device comprises: a first step of acquiring two dimensional photometric information for an image of a photographic subject during non-emission of light by a flash light emission device; a second step of separating the image of the photographic subject into two groups, based upon the photometric information acquired in the first step; a third step of acquiring photometric information for the image of the photographic subject during a first episode of light emission by the flashlight emission device before photography; a fourth step of multiplying the photometric information acquired by the third step by different coefficients for the two groups; and a fifth step of calculating an amount of light required during photography, that is to be emitted during a second episode of light emission by the flash light emission device, based upon the photometric information after multiplication by these coefficients by the fourth step.

DESCRIPTION OF PREFERRED EMBODIMENTS

Embodiment One

Figure 1:
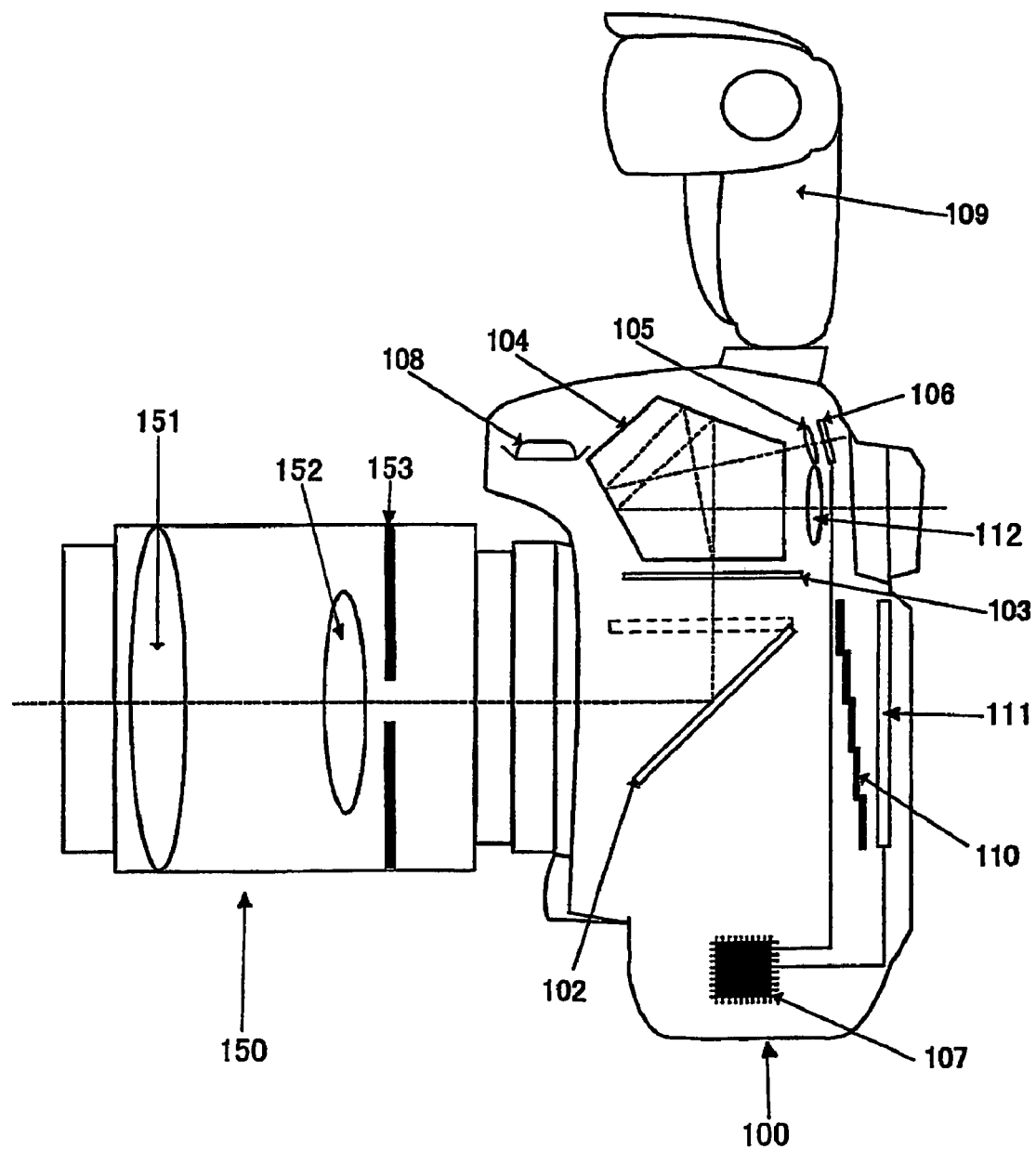
FIG. 1 is a figure for explanation of the structure of the principal portions of a single lens reflex electronic camera according to a first embodiment of the present invention.

FIG. 1 is a figure for explanation of the structure of the principal portions of a single lens reflex electronic camera according to a first embodiment of the present invention. In FIG. 1, a photographic lens 150 of a removable type is fitted to a camera main body 100.

Light from a photographic subject is incident into the camera main body 100 via lens optical systems 151 and 152 of the photographic lens 150 and an iris 153. Before a release button 108 is actuated, this light from the photographic subject that is incident into the camera main body 100 is conducted by a quick return mirror 102 that is positioned as shown by the solid lines to a viewfinder unit above it, and is imaged upon a viewfinder screen 103. Moreover, a portion of this light from the photographic subject that is incident into the camera main body 100 is also imaged upon a distance measurement element not shown in the figures. The detection signal of this distance measurement element is used for detecting the state of focus adjustment by the photographic lens 150.

The light that is imaged upon the viewfinder screen 103 is also incident upon a roof pentaprism 104. One portion of this light from the photographic subject that is incident upon the roof pentaprism 104 is conducted to an eyepiece optical system 112, while another portion thereof is also conducted to an area sensor imaging optical system 105. This area sensor imaging optical system 105 re-images an image of the photographic subject upon an area sensor 106. This area sensor 106 outputs a photoelectric conversion signal corresponding to the brightness of the image of the photographic subject to a calculation device 107. The area sensor 106 includes a plurality of photoelectric conversion elements corresponding to pixels, and may consist of a CCD image sensor or the like; but its light reception surface is smaller than that of an image sensor 111 that will be described hereinafter, and the number of pixels upon it is also smaller.

After the release button 108 is depressed, the quick return mirror 102 rotates to the position shown by the broken lines, and the light from the photographic subject is conducted to an image sensor 111 via a shutter 110, so that an image of the photographic subject is imaged upon the image capturing surface of this image sensor 111. The image sensor 111 includes a CCD image sensor or the like that includes a plurality of photoelectric conversion elements corresponding to pixels. And the image sensor 111 captures an image of the photographic subject by imaging it upon its image capture surface, and outputs to the calculation device 107 a photoelectric conversion signal corresponding to the brightness of this image of the photographic subject.

A flash device 109 is installed to an accessory shoe (not shown in the figures) of the camera main body 100. When emission of light during photography is permitted, this flash device 109 is controlled to emit an amount of light that is commanded from the camera main body 100, at a timing that is also commanded from the camera main body 100.

Figure 2:
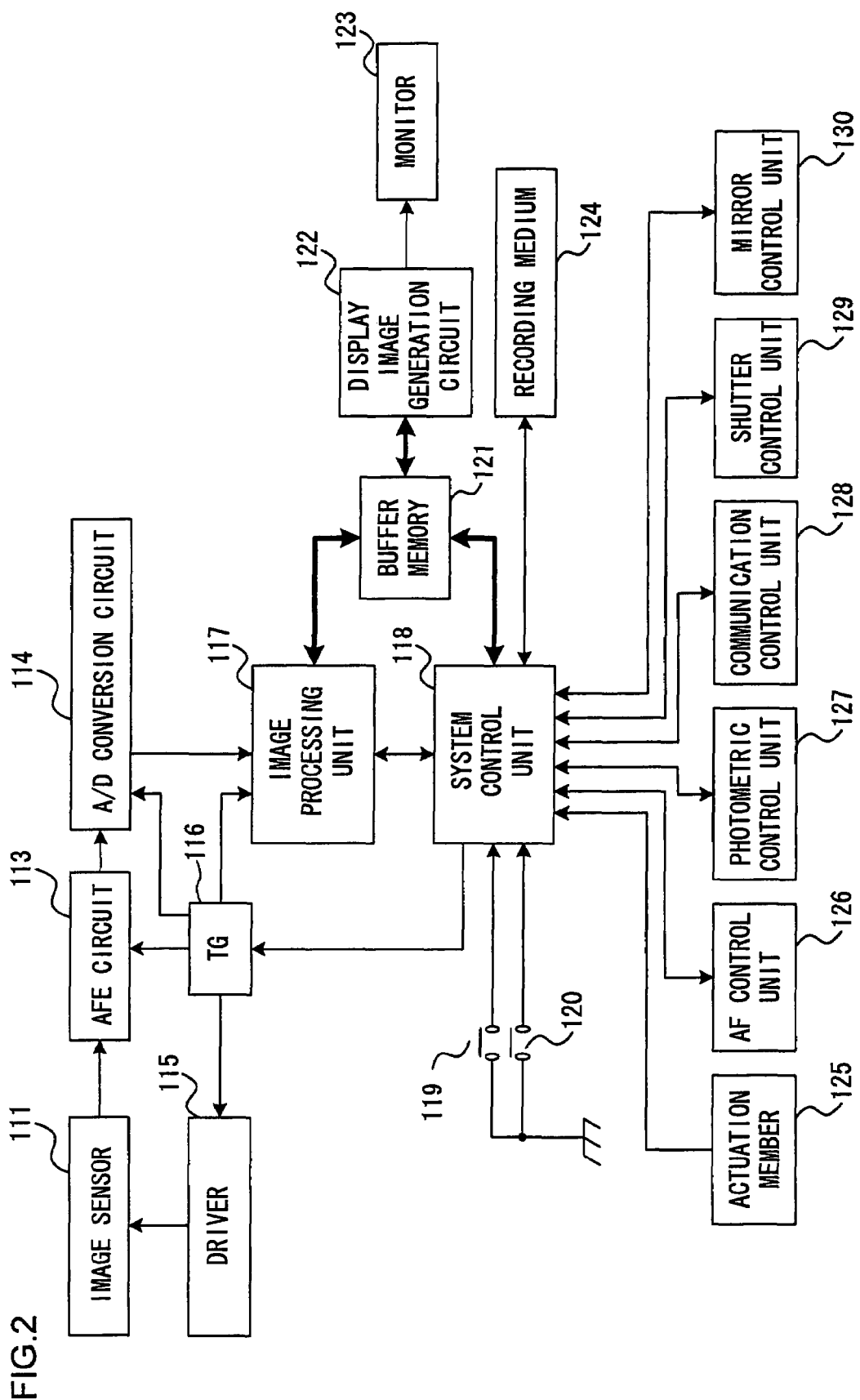
FIG. 2 is a block diagram showing an example of a circuit structure of this single lens reflex electronic camera.

FIG. 2 is a block diagram showing an example of a circuit structure for the above described single lens reflex electronic camera. A timing generator (TG) 116 generates a timing signal according to a command that is outputted from a system control unit 101, and this timing signal is supplied to each of a driver 115, an AFE (Analog Front End) circuit 113, and an A/D conversion circuit 114. The driver 115 drives the image sensor 111 to accumulate electric charge, generates a drive signal for discharging the accumulated electric charge using the above described timing signal, and supplies this drive signal that it has thus generated to the image sensor 111.

The AFE (Analog Front End) circuit 113 performs analog processing (gain control or the like) upon the photoelectric conversion signal (the accumulated electric charge) that is outputted from the image sensor 111. And the A/D conversion circuit 114 converts the image capture signal after this analog processing into a digital signal.

A system control unit 118 and an image processing unit 117 which will be described hereinafter, correspond to the calculation device 107 of FIG. 1. The system control unit 118 is constituted by a microcomputer or the like, and inputs signal outputted from various blocks that will be described hereinafter, performs predetermined calculations, and outputs control signals to the various blocks based upon the results of these calculations.

A half press switch 119 and a full press switch 120 are actuated in response to depression actuation of the release button 108 (see FIG. 1), and each of them, when actuated, outputs an ON signal to the system control unit 118. The ON signal from the switch 119 is outputted when the release button 108 is actuated so as to be depressed to around half of its normal stroke, and this output is cancelled by canceling this half stroke depression actuation. And the ON signal from the switch 120 is outputted when the release button 108 is actuated so as to be depressed through its normal stroke, and this output is cancelled when this normal stroke depression actuation is cancelled.

Actuation members 125 output to the system control unit 118 setting and changeover signals corresponding to various types of setting and selection actuation. In these actuation members 125, there are included an actuation member that selects photographic mode or the like, an actuation member that sets image capture sensitivity (ISO sensitivity) and exposure calculation mode (program auto, aperture priority auto, shutter speed priority auto, and so on) and the like, and a cruciform switch or the like that outputs a signal indicating its actuation direction.

The AF control unit 126 includes the distance measurement element described above. Using the detection signal from this distance measurement element (not shown in the figures), the AF control unit 126 detects the state of focus adjustment (i.e. the amount of defocusing) of the photographic lens 150, and calculates a shift amount for the lens optical system 152, that is for focus adjustment, in correspondence to the result of this detection. A signal that specifies the shift amount for the lens optical system 152 is transmitted to the photographic lens 150 via the system control unit 118 and the communication control unit 128.

The photometric control unit 127 includes the area sensor 106 of FIG. 1. This photometric control unit 127 calculates the luminance (brightness) of the photographic subject by using the detection signal (the image-capture signal) from the area sensor 106. The photometric control unit 127 also performs per se known exposure calculation using the image capture sensitivity that is set, lens information that is received via the communication control unit 128, and the luminance of the photographic subject that has been calculated, and thereby determines a control exposure. With regard to the exposure calculation mode, this is performed in an exposure calculation mode corresponding to the actuation signal from the actuation member 125.

The communication control unit 128 performs communication with the photographic lens 150 that is installed to the camera main body 100, with the flash device 109 that is installed to the camera main body 100, and with an external device (a personal computer or the like) that is connected to the camera main body 100 by wireless or by cable. In such communication between the camera main body 100 and the photographic lens 150, while on the one hand lens information such as the aperture value and the lens data and so on is transmitted from the photographic lens 150 to the camera main body 100, on the other hand lens control information such as the above described shift amount for the focus lens and drive commands and so on are transmitted from the camera main body 100 to the photographic lens 150.

And, in communication between the camera main body 100 and the flash device 109, while on the one hand battery information and light emission preparation information on the flash device 109 side is transmitted from the flash device 109 to the camera main body 100, on the other hand information that commands the above described light emission timing and amount of light to be emitted is transmitted from the camera main body 100 to the flash device 109.

In communication between the camera main body 100 and an external device, while on the one hand maintenance information and program data and so on is transmitted from the external device to the camera main body 100, on the other hand maintenance information and photographic image data and so on is transmitted from the camera main body 100 to the external device.

A shutter control unit 129 performs charge and drive control of the shutter 110 (see FIG. 1) according to a command issued from the system control unit 118. And a mirror control unit 130 controls mirror up driving of the quick return mirror 102 (retraction thereof to its position shown in FIG. 1 by the broken lines) and mirror down driving (returning thereof to its position shown in FIG. 1 by the solid lines), according to a command issued from the system control unit 118.

The image processing unit 117 includes an ASIC or the like. According to commands issued from the system control unit 118, this image processing unit 117 not only performs image processing such as white balance processing and the like upon the image data after digital conversion, but also performs compression processing to compress the image data after image processing in a predetermined format, and decompression processing to decompress image data that has been compressed.

A display image generation circuit 122 generates display data for display upon a liquid crystal monitor 123. This liquid crystal monitor 123 is disposed upon the rear surface of the camera main body 100, and displays photographic images and actuation menus and the like. A recording medium 124 consists of a data storage element such as, for example, a memory card or the like. The system control unit 118 can store data for photographic images upon this recording medium 124, and can read out data stored upon the recording medium 124. A buffer memory 121 is used for temporarily storing data during, and before and after, various types of image processing, image compression processing, and display data generation processing.

Figure 3:
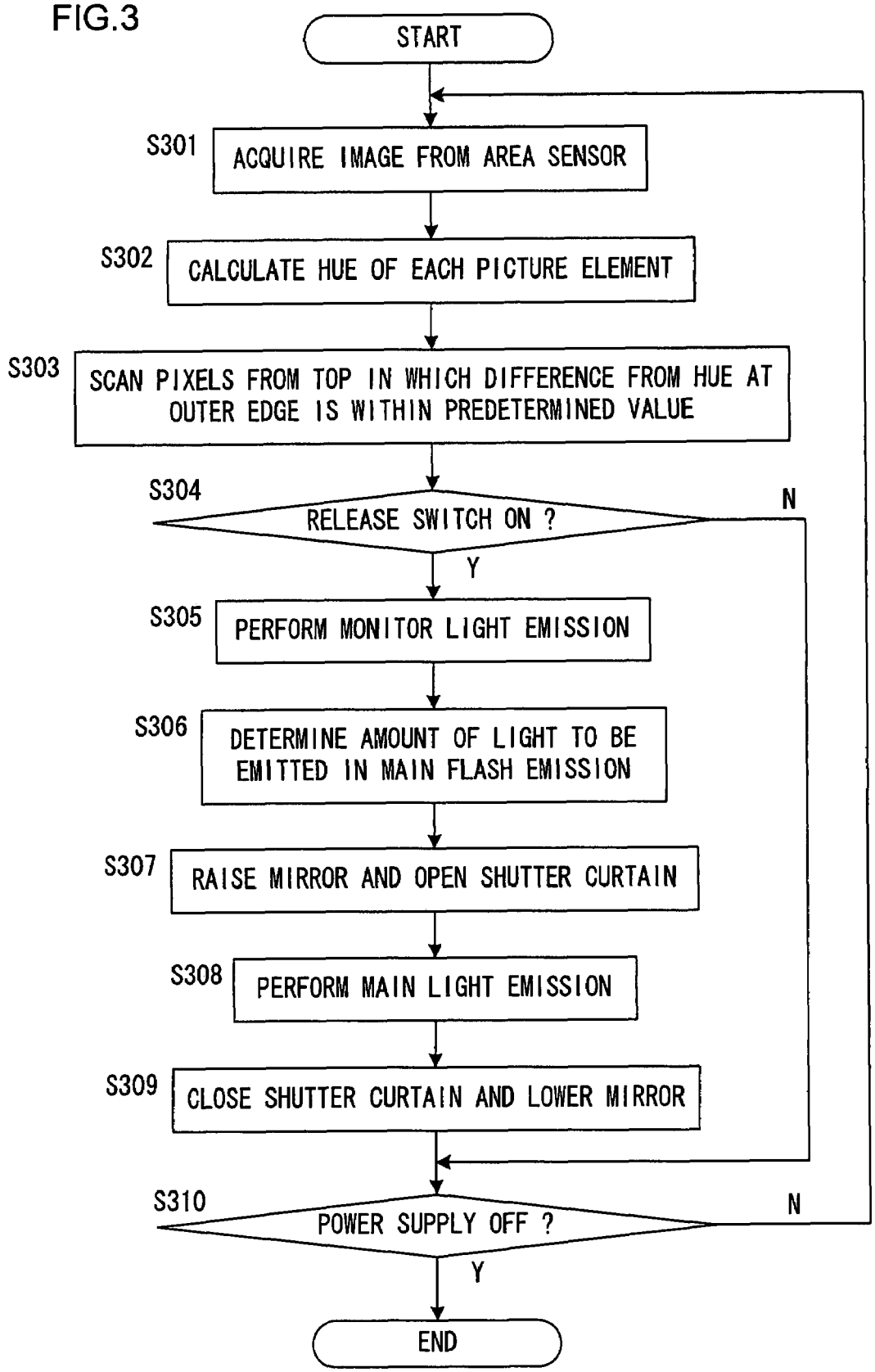
FIG. 3 is a flow chart for explanation of the flow of control during photographic processing performed by a system control unit.

Since the single lens reflex electronic camera of this embodiment is distinguished in the manner by which the amount of light for emission from the flash device 109 is calculated, accordingly the explanation will concentrate upon the operation when using the flash device 109. FIG. 3 is a flow chart for explanation of the flow of control during photographic processing performed during photography by the system control unit 118 when using the flash device 109. The system control unit 118 repeatedly executes the processing steps shown in FIG. 3 while the camera power supply is turned ON.

Figure 4:
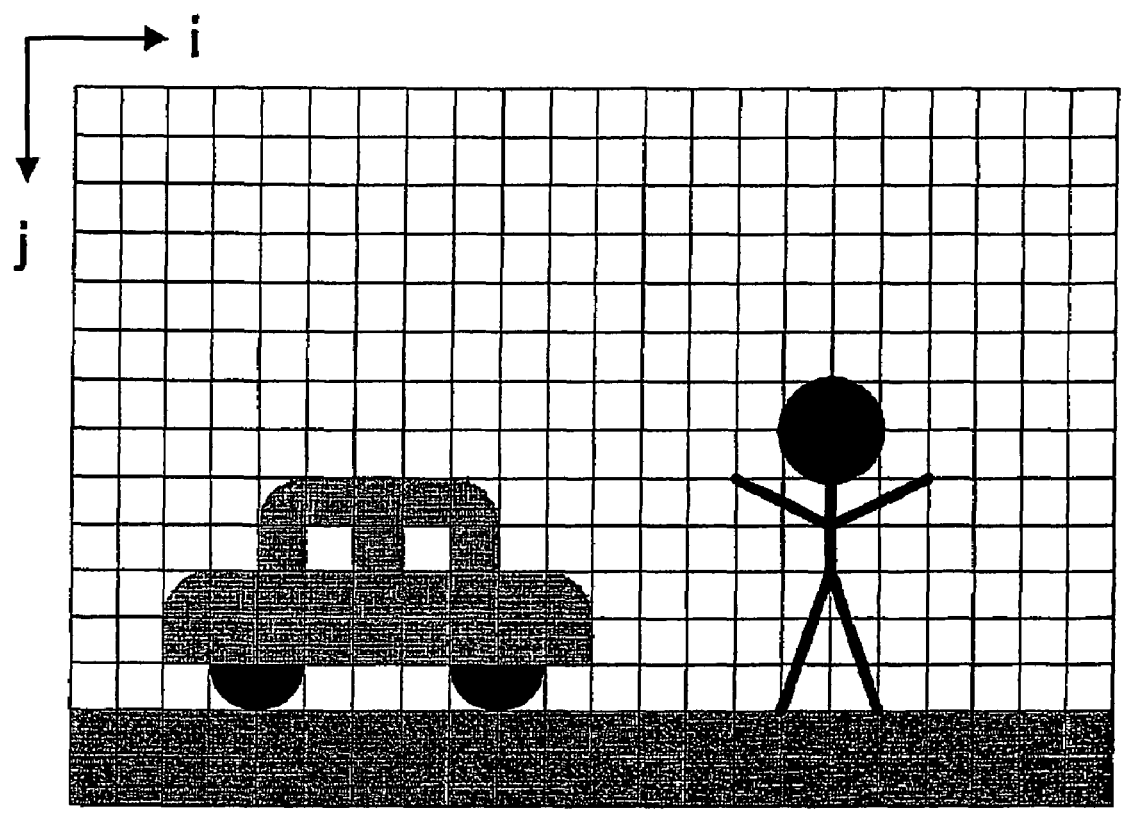
FIG. 4 is a figure showing an example of an image of a photographic subject that is being imaged upon an area sensor.
Figure 5:
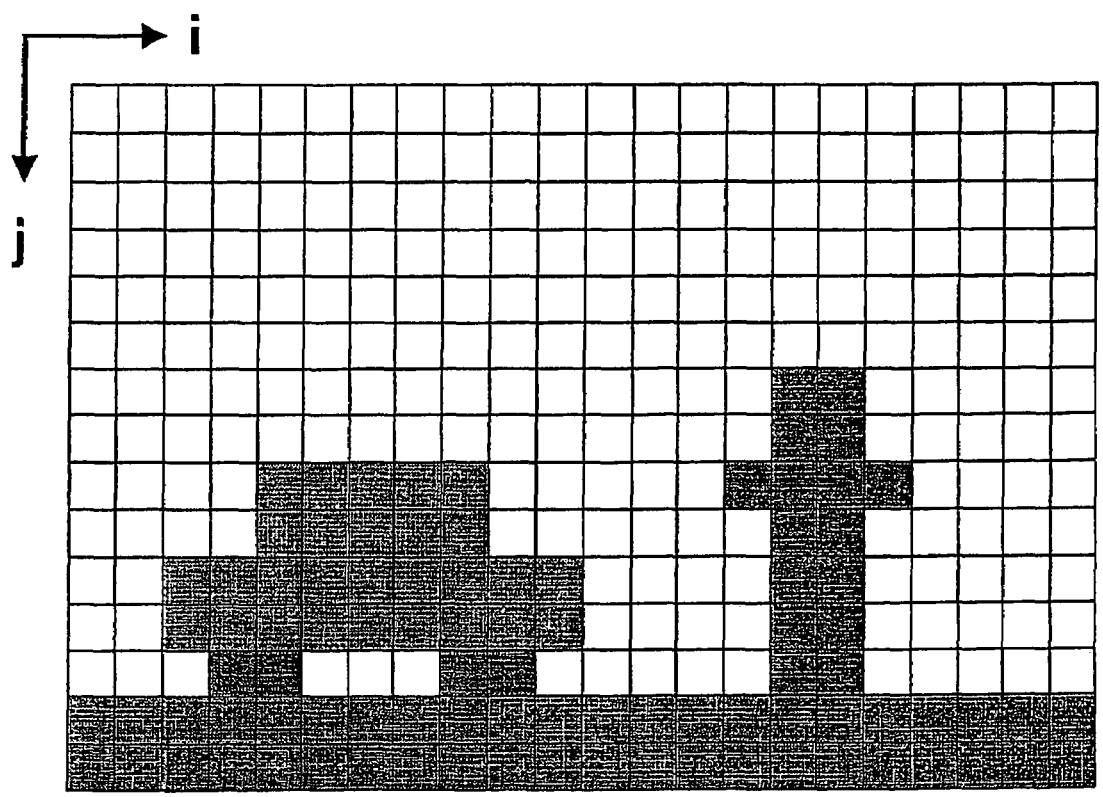
FIG. 5 is a figure showing an example of the image acquired by the area sensor when it has captured the image of the photographic subject shown in FIG. 4.

When an actuation signal is inputted from the half press release switch 119, the system control unit 118 sends a command to the photometric control unit 127 to cause it to perform AE (automatic exposure) calculation, and also sends a command to the AF control unit 126 to cause it to perform AF (automatic focus adjustment) operation. In a step S301 of FIG. 3, the system control unit 118 acquires an image signal (a photoelectric conversion signal from each pixel) from the area sensor 106, and then the flow of control proceeds to a step S302. FIG. 4 is a figure showing an example of an image of a photographic subject that is being imaged upon the area sensor 106, and FIG. 5 is a figure showing an example of the image acquired by the area sensor 106, when it has captured the image of the photographic subject shown in FIG. 4. The example shown in FIGS. 4 and 5 is an example in which the image has been captured with the camera main body 100 being held in a horizontal orientation (i.e. in its normal orientation).

The area sensor 106 may have, for example, 22 pixels along its horizontal direction (the i direction) and 15 pixels along its vertical direction (the j direction). The alignments along the horizontal direction will be termed rows, and the alignments along the vertical direction will be termed columns. In other words, this area sensor 106 has 22 columns×15 rows of pixels. R (red), G (green), and B (blue) color filters are provided upon the image capture surface of the area sensor 106, corresponding to the positions of the pixels. Since the area sensor 106 acquires an image through these color filters, accordingly the detection signal from the area sensor 106 includes color information in the RGB color system.

In the step S302, the system control unit 118 calculates the hue of each pixel by a per se known method, and then the flow of control proceeds to a step S303. It will be assumed that the hue of each pixel [i,j] is denoted by Hue [i] [j]. Here, is an integer from 1 to 22, and j is an integer from 1 to 15.

In the step S303, the system control unit 118 separates the photographic image, using the Hue [i] [j], into two regions: a background region (a region in which the main photographic subject is not present) and a non-background region (a region in which the main photographic subject is present). In concrete terms, by scanning the pixel columns of the image that has been acquired by the area sensor 106 in order from one end (for example, the end at the top of the image of the photographic subject) in the direction of the other end (i.e., in this example, in the direction towards the bottom of the image of the photographic subject), the system control unit 118 detects the pixel positions at which the hue changes in excess of a predetermined range.

The pixel position detection described above is given by the following conditional expressions (1) and (2):

$$ABS(Hue[i][j]-Hue[i][1])<ThHue \quad (1)$$

Here, ABS( ) is the function of calculating the absolute value of the expression in the parentheses. And ThHue is a threshold value for decision that is determined in advance from the results of experiments.

$$MASK[i][j-1] \neq 0 \quad (2)$$

Here, MASK[i] [j] means whether or not the region that corresponds to this pixel is included in the background. If MASK[i] [j] is not 0 (for example if it is 1) then it is included in the background, while if MASK[i] [j] is 0 then it is not included in the background. In this embodiment, the initial values of MASK[i] [1] in the uppermost pixel row are taken as being 1 (i.e. these pixels are supposed to be background), and the initial values of MASK[i] [j] in the 2nd through the 15th pixel rows (i.e. for $2 \leq j \leq 15$) are taken as being 0 (i.e. these pixels are supposed to be non-background).

The system control unit 118 considers that a pixel position [i,j] for which the conditional expression (1) is not satisfied is upon the boundary that separates the background region and the non-background region from one another. And, if the conditional expression (1) is satisfied, then the system control unit 118 performs the decision specified by the conditional expression (2), and, if the conditional expression (2) is satisfied, then it increments the value of MASK[i] [j] for the pixel in question. In other words, it sets MASK[i] [j] to equal 1.

Figure 6:
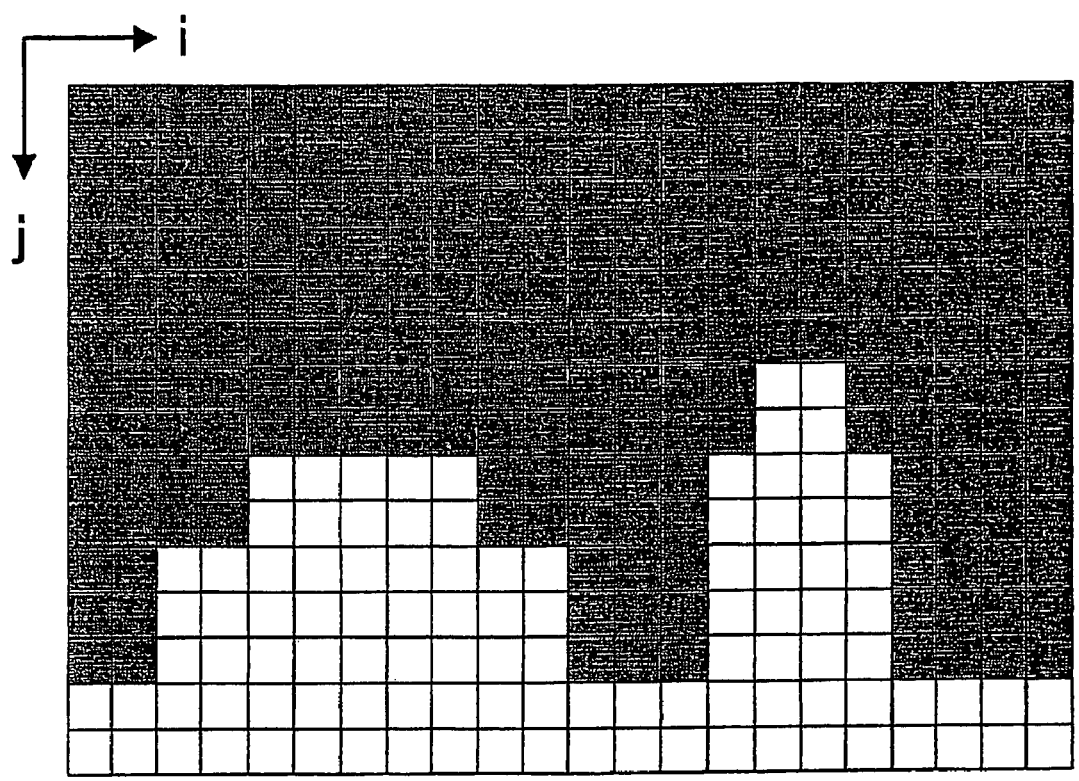
FIG. 6 is a figure showing an example of a situation in which the image of the photographic subject is separated into two groups.

By repeating the above decisions, the hue of the pixel in the uppermost pixel row (the top row), that is hypothesized to be part of the background, and the hue of the pixel in the second and lower pixel rows in each column is sequentially compared together, and the pixel position in each pixel column, for which the hue changes in excess of the threshold value decided upon initially, is taken as being upon the boundary between the background region and the non-background region. FIG. 6 is a figure showing an example of a situation in which the image of the photographic subject has been separated into these two groups. The region at the upper side of the screen whose color is dark is the background region, and the region at the lower side of the screen whose color is light is the non-background region.

After this division into regions, in a step S304, the system control unit 118 decides whether or not the full press release switch has been actuated. If an actuation signal from the full press switch 120 has been inputted, then the system control unit 118 reaches an affirmative decision in this step S304 and the flow of control proceeds to a step S305. On the other hand, if no actuation signal from the full press switch 120 has been inputted, then the system control unit 118 reaches a negative decision in this step S304, and the flow of control is transferred to a step S310.

In the step S305, the system control unit 118 sends a command to the communication control unit 128 so as to cause a signal that commands emission of monitor light to be transmitted to the flash device 109, and then the flow of control proceeds to a step S306. Due to this, the flash device 109 performs emission of monitor light at a guide number GNMon for monitor light emission.

In the next step S306, the system control unit 118 determines the amount of light that is to be emitted by the flash device 109 for the main light emission during photography, as explained below.

Figure 7:
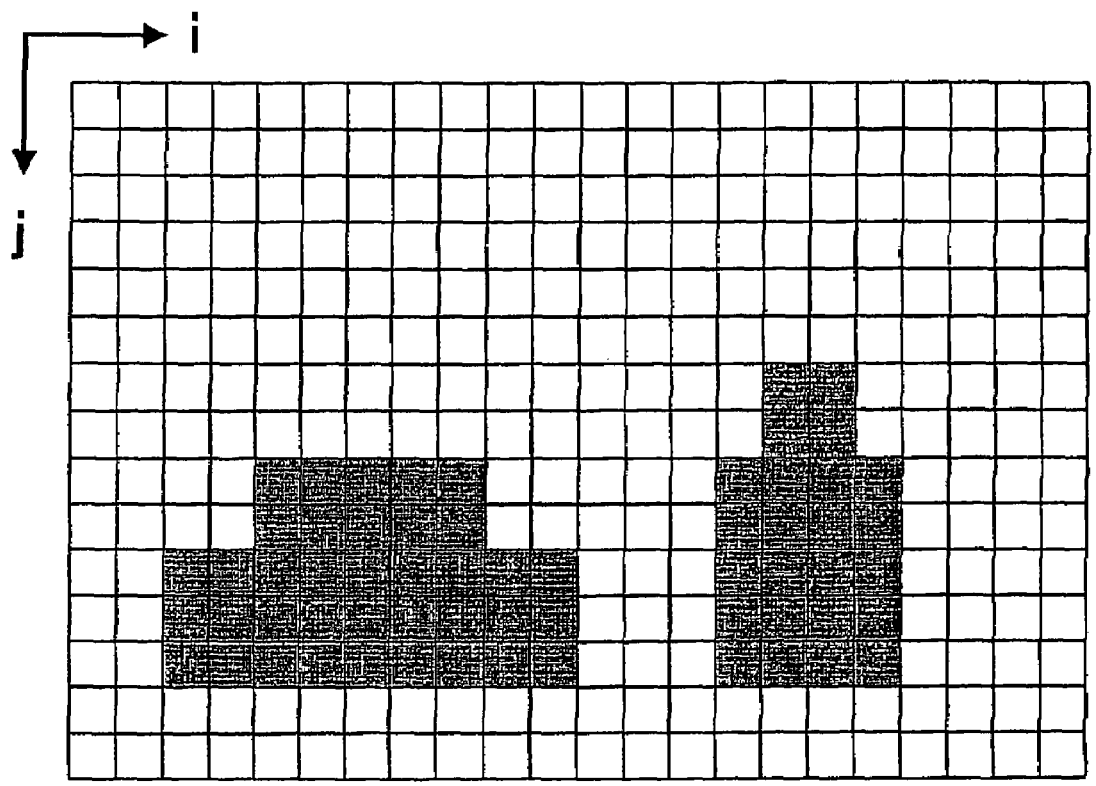
FIG. 7 is a figure showing an example of an image acquired by the area sensor, during monitor light emission.

The system control unit 118 acquires the image signal that has been captured by the area sensor 106 during this emission of monitor light by the flash device 109. FIG. 7 is a figure showing an example of an image acquired by the area sensor 106 during this monitor light emission. The region upon the screen whose color is dark is a region defined by those pixels that have received reflected monitor light. The system control unit 118 further calculates weightings to be accorded to the image that has been acquired (the amount of reflected monitor light), according to the following Equation (3):

$$Grade[i][j]=MASK[i][j] \times GCONST \quad (3)$$

Here, GCONST is a constant value that is the weight to be accorded to the background region, and has a negative value.

The system control unit 118 further calculates a weighting multiple according to the following Equation (4):

$$Wt[i][j] = \text{Pow}(\text{Grade}[i][j] - \text{MaxGrade}) \div \sum\sum (\text{Pow}(\text{Grade}[i][j] - \text{MaxGrade})) \quad (4)$$

Here, Pow( ) is a function that calculates the argument value for raising "2" to the power of the value in the parentheses. And Max Grade is the maximum value of Grade[i] [j]. The range over which the summations are performed is all of [i] [j].

Using the value that has been calculated with the above Equation (4), the system control unit 118 performs weighting upon the image described above (the reflected monitor light amount) according to the following Equation (5):

$$Rm\text{Main} = \Sigma\Sigma(Wt[i][j] \times Voy[i][j]) \quad (5)$$

Here, Voy[i][j] is calculated according to the following Equation (6):

$$Voy[i][j] = Rmix \times R[i][j] + Gmix \times G[i][j] + Bmix \times B[i][j] \quad (6)$$

Here, R[i] [j], G[i] [j], and B[i] [j] are the respective RGB components of the image (the reflected monitor light amounts). And Rmix, Gmix, and Bmix are constant values for generating luminance information from the color components for each of the pixels.

After having weighted the image described above (the reflected monitor light amount), the system control unit 118 calculates the appropriate amount of light GN to be emitted during the main light emission, according to the following Equation (7):

$$GN = GN\text{Mon} \times \sqrt{2}^{(RConst + RmMain)} \quad (7)$$

Here, GNMon is a guide number during monitor light emission, and RmConst is a constant value for adjusting the amount of light to be emitted.

And, in the next step S307, the system control unit 118 issues a command to the mirror control unit 130, and starts the driving upwards of the quick return mirror 102. The system control unit 118 also sends a command to the shutter control unit 129 to drive the shutter curtain 110 to open, and then the flow of control proceeds to a step S308.

In this step S308, the system control unit 118 sends a command to the communication control unit 128 and thereby transmits a signal to the flash device 109 that commands the main light emission, and then the flow of control proceeds to a step S309. Due to this, the flash device performs the main light emission according to the guide number GN. And, in this step S309, the system control unit 118 issues a command to the shutter control unit 129, and thereby drives the shutter curtain 110 to close. The system control unit 118 also issues a command to the mirror control unit 130 and starts the down driving of the quick return mirror 102, and then the flow of control proceeds to a step S310.

While the above described shutter 110 is open, the system control unit 118 causes the image sensor 111 to accumulate electric charge for photography, and to discharge the accumulated electric charge after the shutter 110 is closed. And the system control unit 118 issues a command to the image processing unit 117 and causes it to perform predetermined image processing upon the captured image, and records the image data after this image processing upon the recording medium 124. Moreover, the system control unit 118 issues a command to the display image generation circuit 122, and causes it to replay display the photographic image upon the liquid crystal monitor 123. With this, the sequence for photographic processing comes to an end.

In the step S310, the system control unit 118 makes a decision as to whether or not the power supply of the camera has been turned OFF. If the camera power supply has been turned OFF, then the system control unit 118 reaches an affirmative decision in this step S310, and the processing shown in FIG. 3 terminates. But, if the camera power supply has not been turned OFF, then the system control unit 118 reaches a negative decision, and the flow of control returns to the step S301.

According to the first embodiment of the present invention as explained above, the following beneficial operational effects are available.

(1) Based upon the image information that is obtained two dimensionally by the area sensor 106 during monitor light emission (the first episode of light emission) by the flash light device 109, the camera systems 100, 109, and 150, that calculate the amount of main light emission (the second episode of light emission) by the flash device 109, divide the image of the photographic subject based upon the image information that is obtained during non-emission of light by the flash device 109 (the step S301) into two groups, and, when calculating the above described amount of main light emission, perform different weighting (in the step S306) upon the image information obtained from the area sensor 106 for the above described two groups. By thus calculating the amount of light to be emitted during the main episode of flash emission while changing the weighting between the two groups, it is possible to calculate an amount of light to be emitted during the main episode of flash emission that is suitable for these two separated regions, as compared to the case of calculating the amount of light to be emitted during the main episode of flash emission by handling the image information for the entire area of the image of the photographic subject all in a uniform manner.

(2) It is arranged to decide upon the above described boundary for division by deciding whether or not the difference in hue between a pixel at one edge (for example the uppermost pixel row) of the image information from the area sensor 106 and a pixel present in the direction from the one edge towards its other edge (the lowermost pixel row) is within a predetermined decision threshold value. Generally the possibility is high that the edge of the image of the photographic subject is background (i.e. is not included in the main photographic subject), and the possibility is high that image information of the same hue as the background will also be background. Due to this, it is possible to distinguish between the background region and other regions (i.e. regions that have a possibility of including the main photographic subject) in a simple manner.

(3) Since, if pixels of the same hue are continuous, this plurality of pixel regions are considered as being in the same group, accordingly it is possible to consider that one of the two groups into which the image is divided is the background region. Since generally it is usually the case that illumination light from the flash device 109 does not arrive at the background, accordingly distinguishing the background region is desirable for calculating the amount of light to be emitted during the main episode of flash emission.

(4) It is arranged to decide upon the boundary for the above described separation in the direction from the upper edge of the image of the photographic subject upon the image sensor

106 towards its lower edge. The possibility is high that the upper edge of the image of the photographic subject is the background (sky, in the case of photography in the outdoors), and the possibility is high that image information of the same hue as the sky is also sky. As a result, it is possible to distinguish in a simple manner between a background region that is sky, and a non-background region in which there is a possibility that the main photographic subject is included.

(5) Since the weighting allocated to the image information that corresponds to the background region is made to be smaller than the weighting for the image information for the non-background region, accordingly it is possible to lower the contribution of the background region, as compared to the case in which the image information for the entire area of the photographic subject is treated upon the same footing.

(6) Since the proportion of contribution of the above described background region is lowered when calculating the amount of light to be emitted by the flash device 109 during the main episode of flash emission based upon the image information that is obtained two dimensionally by the area sensor 106 during the emission of monitor light, accordingly it is possible to suppress the influence of the background portion of the image, at which the illumination light from the flash device 109 does not arrive. According to FIG. 6, in the region that corresponds to the ground surface (the portion that consists of the lower two rows), the weighting is higher than that of the background region, just as for the main photographic subject. However since, as shown in FIG. 7, the reflected monitor light is not returned from the ground surface during the emission of monitor light, that is different from the case of the main photographic subject, accordingly the image information that corresponds to the ground surface is not reflected in the calculation of the amount of light to be emitted by the flash device 109 during the main episode of flash emission, and it is possible to calculate an amount of light to be emitted by the flash device 109 during the main episode of flash emission that is suited to the main photographic subject.

(7) Since the area sensor 106 is provided separately from the image sensor 111 for photography, and its number of pixels is made to be smaller than the number of pixels upon the image sensor 111 (that has, for example, several millions of pixels), accordingly it is possible to make the camera as a whole more compact, as compared to the case of providing an area sensor 106 that has an area equal to that of the image sensor 111.

Variant Embodiment One

In the above explanation the example was explained of, when dividing the image information from the area sensor 106 into two groups, deciding upon the boundary for separation by deciding whether or not the difference in the hue was within a predetermined hue threshold decision value. Instead of this, it would also be acceptable to arrange to decide upon the boundary for division by deciding whether or not the difference in the luminance is within a predetermined luminance threshold decision value.

Variant Embodiment Two

Furthermore, it would also be acceptable to arrange to make the decision as to the boundary for decision, by deciding based upon both the hue and the luminance.

Variant Embodiment Three

In the above explanation, when deciding upon the boundary for division, it is arranged to compare the hue or the luminance between a pixel at the upper edge of the image information from the area sensor 106 and a pixel present in the direction from the upper edge towards its lower edge. Instead of this, it would also be acceptable to arrange to make comparisons between a pixel at the right edge of the image information from the area sensor 106 a pixel present in the direction from the right edge towards its left edge, or between a pixel at the left edge of the image information from the area sensor 106 a pixel present in the direction from the left edge towards its right edge. Furthermore, by using the information about the focus area that is used for focusing by the AF control unit 126, it would also be acceptable to arrange to decide that the one of the regions of the two groups into which division has been performed, in which this focus area is not included, is the background region.

It should be noted that it may be arranged to compare the hue or the luminance between adjacent pixels from the upper edge of the image information from the area sensor 106 towards its lower edge. Instead of this, it would also be acceptable to arrange to make comparisons between adjacent pixels from the right edge of the image information from the area sensor 106 towards its left edge, or between adjacent pixels from the left edge of the image information from the area sensor 106 towards its right edge.

Variant Embodiment Four

Although a single lens reflex type electronic camera has been explained by way of example, the present invention can also be applied, not to a single lens reflex type camera, but to an electronic camera that obtains photometric information based upon the image capture signal from the image sensor 111. In this case, it is possible to omit the dedicated area sensor 106 for photometry. With the electronic camera of this fourth variant embodiment, it may be arranged to obtain photometric information at a lower density than the density of the pixels during photography, by thinning down and reading out the pixel signal from the image sensor 111, or by grouping together the pixel signals in predetermined regions upon the image capture surface of the image sensor 111.

Variant Embodiment Five

In the above explanation, an example was described in which the camera was held in the horizontal orientation. However, it would also be acceptable for the camera to be held in the vertical orientation. If the camera is held in the vertical orientation, then, in the nomenclature of FIG. 4, the i direction becomes the vertical direction, and the j direction becomes the horizontal direction. And the upper and lower edges of the image of the photographic subject become the upper and lower ends of the end portions in the i direction. In other words, although the upper and lower edges of the photographic field shot by the camera are the end portions in the j direction if the camera is held in the horizontal orientation, if the camera is held in the vertical orientation, these become the end portions in the i direction.

Embodiment Two

Figure 8:
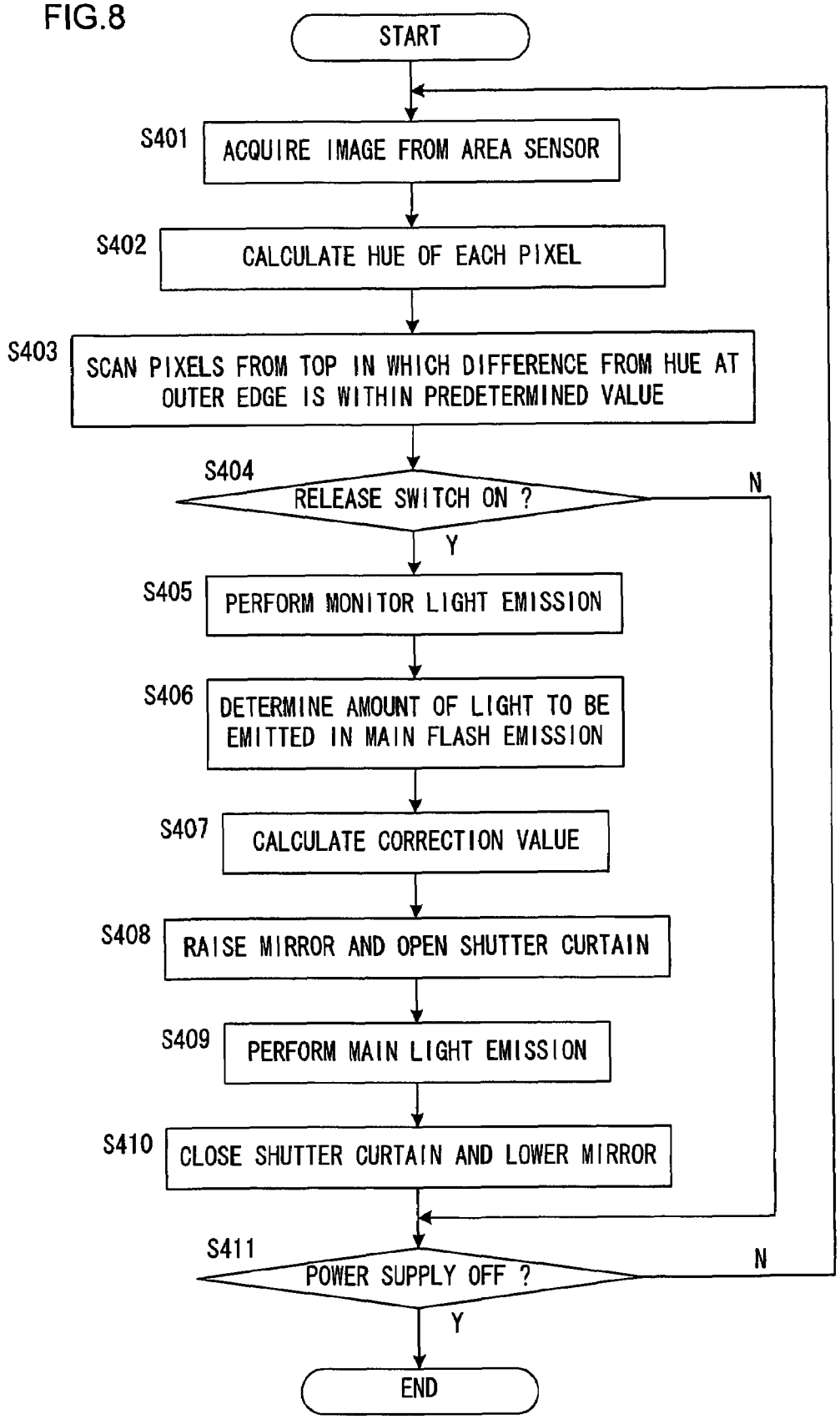
FIG. 8 is a flow chart for explanation of the flow of control during photographic processing, according to a second embodiment of the present invention.

In a second embodiment, the amount of light to be emitted in the main flash episode, that is calculated as in the first embodiment, is corrected based upon the brightness of the ambient light. FIG. 8 is a flow chart for explanation of the flow of control during photographic processing, performed by the system control unit 118 of this second embodiment of the present invention. The processing of FIG. 8 is executed instead of the processing of FIG. 3.

Since the processing in the steps S401 through S406 of FIG. 4 is the same as the processing in the steps S301 through S306 of FIG. 3, explanation thereof is here omitted. In a step S407, the system control unit 118 calculates a correction value for the amount of light GN to be emitted in the main episode of flash emission, in the following manner.

The system control unit 118 calculates the average luminance AveBV of the main photographic subject region, using the image acquired in the step S401 (during non-emission of light by the flash device 109), according to the following Equation (8):

$$AveBV = Average(BV[i][j]) \quad (8)$$

Here, Average( ) is a function that calculates the average value of the argument within the parentheses. And BV[i][j] is the luminance values obtained from the signals from the pixels of the area sensor 106. Moreover, the calculation of the above Equation (8) is performed only upon those pixels for which the above described MASK[i][j] is 0 (i.e. that are in the non-background region) (in other words, upon the region in FIG. 6 at the lower portion of the screen whose color is light).

The system control unit 118 further calculates an exposure deviation dDCmst according to the following Equation (9):

$$dDCmst = AveBV + SV - TV - AV \quad (9)$$

Here, SV is the image capture sensitivity of the image sensor 111 used in apex calculation, TV is the shutter speed used in apex calculation, and AV is the aperture value used in apex calculation.

Using this exposure deviation dDCmst, the system control unit 118 calculates an amount of light to be emitted correction value BLHosei according to the following Equation (10):

$$BLHosei = dDCmst \times BLCONST \quad (10)$$

Here, BLCONST is a constant value for calculating the correction amount for the amount of light to be emitted, and is a negative value.

The above Equation (10) is not applied if the exposure deviation dDCmst is less than or equal to 0 (i.e. if exposure of the non-background region by only the ambient light is insufficient), and is applied, thus reducing the appropriate amount of light to be emitted GN, if the exposure deviation dDCmst is greater than 0 (i.e. if exposure of the non-background region by the ambient light is sufficient).

The system control unit 118 corrects the appropriate amount of light to be emitted according to the following Equation (11):

$$GN = GNMon \times (\sqrt{2})^{BLHosei} \quad (11)$$

Since the processing in the steps S408 through S411 of FIG. 4 is the same as the processing in the steps S307 through S310 of FIG. 3, explanation thereof is here omitted. In this manner, the flash device 109 performs main light emission during exposure, according to the guide number GN after correction.

According to the second embodiment of the present invention as explained above, the following beneficial operational effects are available.

(1) The exposure deviation dDcmst is calculated based upon the signal that corresponds to the non-background region (the region that has a possibility of including the main photographic subject) that has been separated out, as in the first embodiment, from the image signal acquired in the step S401, and the amount of light to be emitted in the main flash episode GN is corrected according to this exposure deviation dDCmst. Thus, it is possible to perform a decision in a manner adapted to the separated screen, as compared to the case in which it is decided whether or not correction of the amount of light GN to be emitted in the main flash episode is required by treating the entire area of the image of the photographic subject in a uniform manner.

(2) If the exposure deviation dDCmst is greater than 0, correction is performed so as to reduce the amount of light GN to be emitted in the main flash episode that has been calculated as in the first embodiment. Due to this, it is possible to suppress the amount of light to be emitted in the main flash episode in a situation in which the ambient light is adequate by itself, so that it is possible to prevent over exposure of the main photographic subject. On the other hand, since the amount of light to be emitted in the main flash episode is not reduced for an exposure deviation dDCmst that is less than or equal to 0, accordingly, in a situation in which the ambient light is inadequate, it is possible to supplement the light level by emission of light from the flash device 109.

Variant Embodiment Six

It would also be acceptable to arrange to perform correction by increasing the amount of light GN to be emitted during the main flash episode, i.e. not only to perform correction by decreasing this amount of light to be emitted during the main flash episode.

Variant Embodiment Seven

Figure 9:
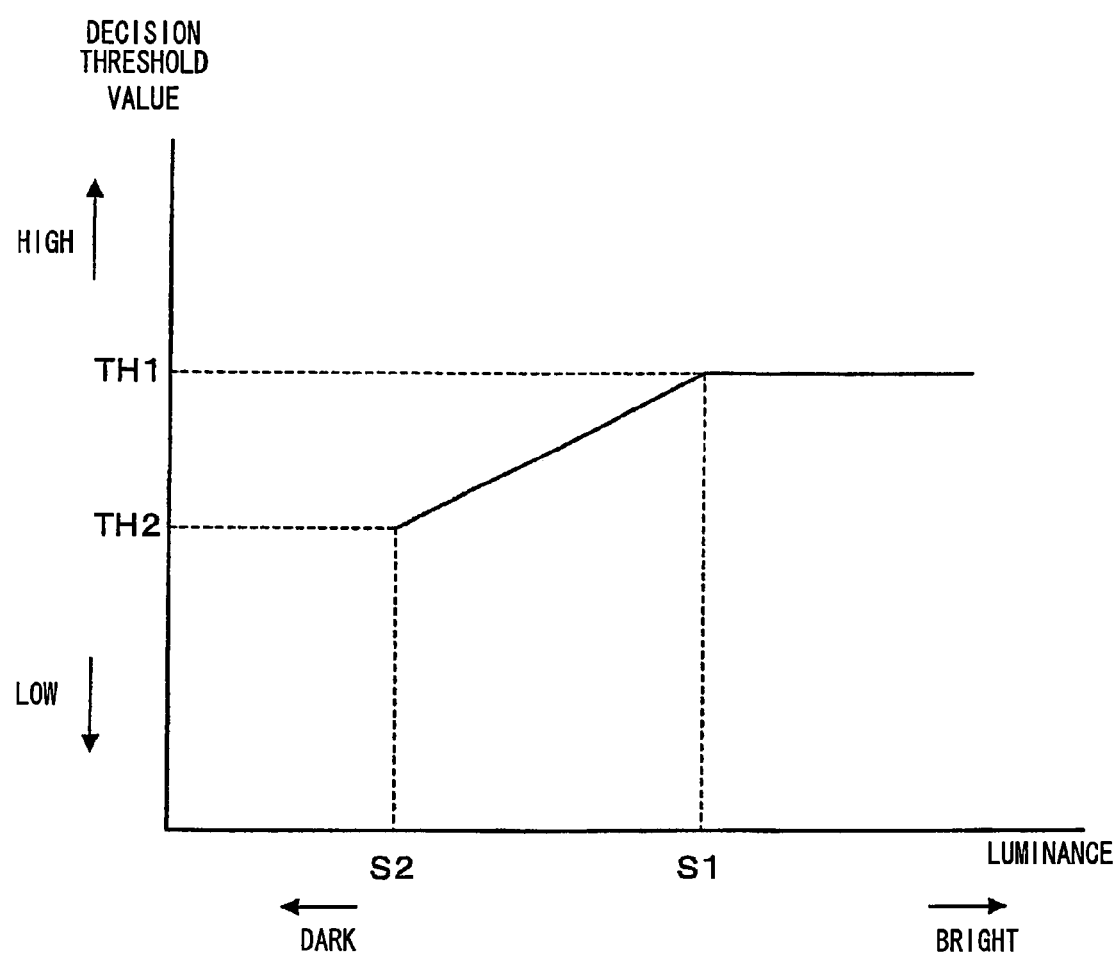
FIG. 9 is a figure for explanation of changing a decision threshold value according to luminance.

It would also be acceptable to change the threshold value described above according to the luminance of the photographic subject. FIG. 9 is a figure for explanation of changing this decision threshold value according to the luminance. The luminance of the photographic subject is shown along the horizontal axis, and the decision threshold value is shown along the vertical axis. If the luminance of the photographic subject is higher than S1, then the system control unit 118 takes the decision threshold value to be used in the hue decision or in the luminance decision to be TH1. And, if the luminance of the photographic subject is in the range lower than S1 but higher than S2, then the system control unit 118 gradually reduces this decision threshold value to be used in the hue decision or in the luminance decision according to change of the luminance. Moreover, if the luminance of the photographic subject is equal to S2, then the system control unit 118 takes the decision threshold value to be used in the hue decision or in the luminance decision to be TH2 (where TH2<TH1). Finally, if the luminance of the photographic subject is lower than S2, then the system control unit 118 calculates the amount of light GN to be emitted in the main flash episode according to the method of the first embodiment, and does not perform correction of the amount of light GN to be emitted in the main flash episode according to the method of the second embodiment.

Variant Embodiment Eight

Figure 10:
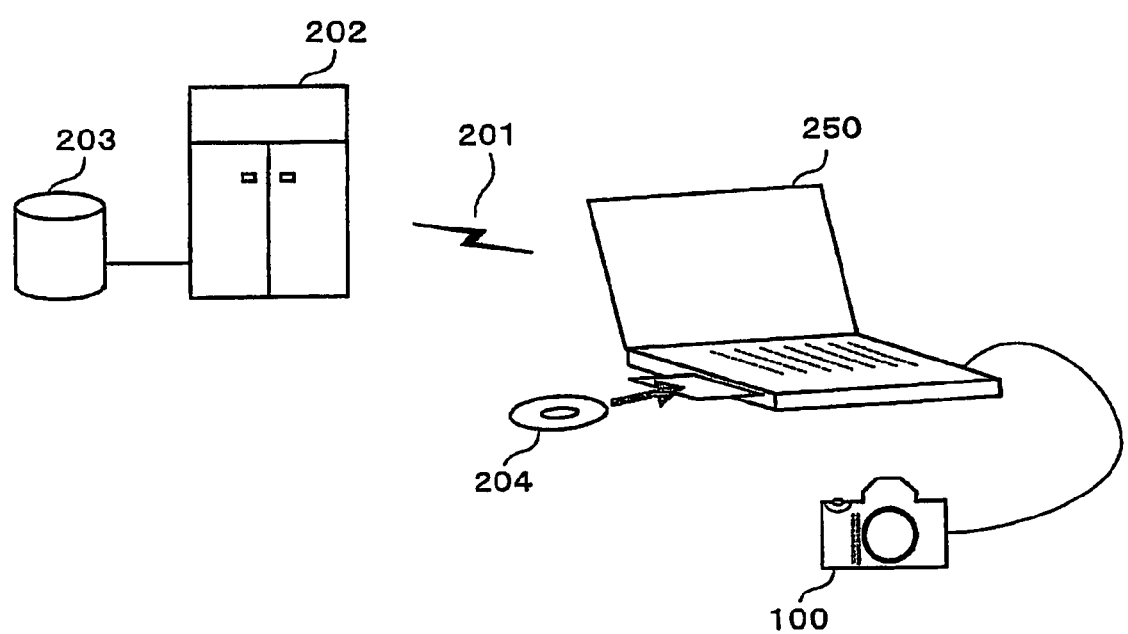
FIG. 10 is a figure for explanation of a computer device.

Although, in the first and the second embodiments explained above, examples were explained in which calculation and correction of the amount of light GN to be emitted in the main flash episode were performed by a program that was stored in advance in the system control unit 118 in the camera main body 100, it would also be acceptable to provide a structure in which a program that performs the photographic processing according to the flow chart of FIG. 3 or FIG. 8 is supplied to the camera main body 100 via a computer device 250, as shown in FIG. 10. When supplying the program from the computer device 250 to the camera main body 100 in this manner, a program is supplied after making communication possible between the computer device 250 and the camera main body 100.

It would also be acceptable for the supply of the program to the computer device 250 to be performed by loading into the computer device 250 a recording medium 204 such as a CD-ROM or the like upon which the program is stored; and it would also be acceptable to arrange to load the program upon the computer device by a method of supply via a communication circuit 201 such as a network or the like. If the program is supplied via the communication circuit 201, then the program is stored upon a hard disk device 203 or the like of a server (a computer) 202 that is connected to the communication circuit 201. Thus this program may be supplied via the recording medium 204 or the communication circuit 201 or the like, and may be supplied as a computer program product in various different types of format.

It should be understood that the system control unit 118 of the camera main body 100 includes an internal microcomputer, that executes a program to perform the photographic processing shown in FIG. 3 or FIG. 8. Accordingly, the system control unit 118 is a computer that is mounted to the camera main body 100.

The above described embodiments are examples, and various modifications can be made without departing from the scope of the invention.

What is claimed is:

1. A camera, comprising:
a photometric unit that acquires two dimensional photometric information of an image of a photographic subject;
a separation unit that separates the image of the photographic subject into two groups, based upon photometric information acquired by the photometric unit during non-emission of light by a flash light emission device; and
a calculation unit that multiplies the photometric information acquired by the photometric unit during a first light emission by the flash light emission device before photography, by different coefficients for the two groups, and calculates an amount of light required for photography that is to be emitted during a second light emission by the flash light emission device, based upon the photographic information after multiplication by the coefficients.

2. A camera according to claim 1, wherein
the separation unit separates the image of the photographic subject by deciding whether or not, between adjacent regions in a direction from a predetermined edge of the image of the photographic subject towards another edge, at least one of a hue and a luminance specified by photometric information corresponding to each of the regions is approximately equal.

3. A camera according to claim 2, wherein
if a plurality of regions for which the approximate equality has been decided are connected together, the separation unit takes a group that consists of the plurality of regions as a first group among the two groups.

4. A camera according to claim 3, wherein
the separation unit decides whether or not at least one of the hue and the luminance is approximately equal in a downwards direction from an upper side of the image of the photographic subject.

5. A camera according to claim 3, wherein
the calculation unit makes a coefficient for photometric information that belongs to the first group smaller than a coefficient for photometric information that belongs to a second group.

6. A camera according to claim 3, further comprising:
a correction unit that corrects the amount of light during the second light emission calculated by the calculation unit, based upon photometric information that belongs to the second group among photometric information acquired by the photometric unit during non-emission of light by the flash light emission device.

7. A camera according to claim 6, wherein
the correction unit corrects the amount of light during the second light emission so as to be reduced, if the brightness specified by the photometric information that belongs to the second group is greater than or equal to a predetermined value.

8. A camera according to claim 1, wherein:
the two groups are a background region and a non-background region;
the photometric information is information from pixels that are arranged two-dimensionally; and
the separation unit (1) sets an upper end pixel as being in the background region for each column of the image of the photographic subject, (2) detects a first pixel in a downwards direction from the upper end pixel, the photometric information of which changes by greater than or equal to a predetermined value with respect to the photometric information of the upper end pixel, as being a pixel in a boundary position, (3) sets a region from the upper end pixel to the pixel in the boundary position as being the background region, and (4) sets a region in a downward direction from the pixel in the boundary position as being the non-background region.

9. A camera according to claim 8, wherein
the calculation unit makes a coefficient for the photometric information that belongs to the background region smaller than a coefficient for the photometric information that belongs to the non-background region.

10. A camera according to claim 1, wherein:
the photometric unit comprises an image sensor for photometry that is different from an image sensor for photography; and
the number of pixels of the image sensor for photometry is smaller than the number of pixels of the image sensor for photography.

11. A camera according to claim 1, wherein
the photometric unit acquires the photometric information at a lower density than the pixel density of a photographic image from the image sensor for photography.

12. A computer program product including an amount of light to be emitted calculation program that is executed by a computer within a camera, the program comprising:
a first instruction that acquires two dimensional photometric information for an image of a photographic subject during non-emission of light by a flash light emission device;
a second instruction that separates the image of the photographic subject into two groups, based upon the photometric information acquired by the photometric unit;
a third instruction that acquires photometric information for the image of the photographic subject during a first episode of light emission by the flash light emission device before photography;

a fourth instruction that multiplies the photometric information acquired by the third instruction by different coefficients for the two groups; and a fifth instruction that calculates an amount of light required during photography, that is to be emitted during a second episode of light emission by the flash light emission device, based upon the photometric information after multiplication by these coefficients by the fourth instruction.

13. An amount of light to be emitted calculation method for a flash light emission device, comprising:

a first step of acquiring two dimensional photometric information for an image of a photographic subject during non-emission of light by a flash light emission device;

a second step of separating the image of the photographic subject into two groups, based upon the photometric information acquired in the first step;

a third step of acquiring photometric information for the image of the photographic subject during a first episode of light emission by the flash light emission device before photography;

a fourth step of multiplying the photometric information acquired by the third step by different coefficients for the two groups; and a fifth step of calculating an amount of light required during photography, that is to be emitted during a second episode of light emission by the flash light emission device, based upon the photometric information after multiplication by these coefficients by the fourth step.

* * * * *